Oct. 15, 1946.
P. S. CHRISTALDI
2,409,419
DEVICE FOR MEASURING IMPEDANCES
Filed June 8, 1943
Fig. 1
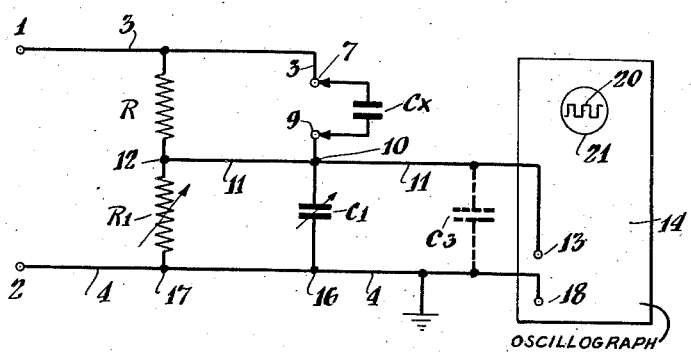
Fig. 2
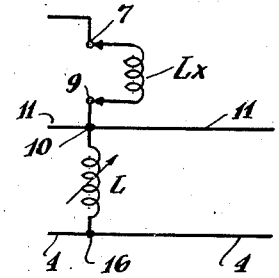
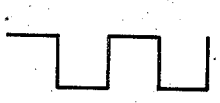
Fig. 3
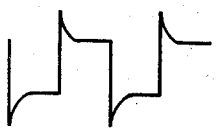
Fig. 4
Fig. 5
Peter S. Christaldi, INVENTOR.
BY
Charles W. Mortimer
ATTORNEY Patented Oct. 15, 1946

2,409,419

UNITED STATES PATENT OFFICE 2,409,419

DEVICE FOR MEASURING IMPEDANCES

Peter S. Christaldi, Upper Montclair, N. J., assignor to Allen B. Du Mont Laboratories, Inc., Passaic, N. J., a corporation of Delaware Application June 8, 1943, Serial No. 490,032

6 Claims. (Cl. 175—183)

This invention relates to a device for measuring electrical impedances whether they are resistances, inductances or capacitances. Where the term impedance is used herein, it will be understood to mean either resistance or inductance or capacitance or a series or parallel combination of two or more of the same sort of impedances.

By this invention impedances can be easily and readily measured very quickly without requiring high skill on the part of the operator, simply by turning a knob or otherwise varying an adjustable known impedance.

In carrying out the invention a balance is obtained by applying a signal to a combination of four impedances, three of which are known and the fourth is the one to be measured. At least one of the three known impedances is variable. The signal that is used in the input to the device is attenuated, and an analyzer of the attenuated signal, such as an oscillograph, is used to determine when a balance is obtained. From this the value of the unknown impedance can be ascertained as will be explained below.

The invention will be understood from the description in connection with the accompanying drawing, in which:

Fig. 1 is a diagram of the device;

Fig. 2 shows a modification of a part of Fig. 1; and

Figs. 3, 4 and 5 are types of signals that may appear upon the oscillograph and enable the operator to know when a balance is obtained so that the value of the unknown impedance can be ascertained.

Reference characters 1 and 2 indicate the input terminals of leads 3 and 4 to the device. Known resistances R and $R_1$, one of which may be variable, are connected in series across the leads 3 and 4. The lead 3 ends in the terminal 7.

The unknown impedance, which is shown on the drawing as a condenser $C_x$, is an example of what can be measured. It is connected between the terminals 7 and 9. The terminal 9 is connected at 10 to the lead 11 which extends from a point 12 between resistances R and $R_1$ to the input terminal 13 for the commonly known vertical beam deflection system of the oscillograph 14. A horizontal beam deflection system of the known sort using a sawtooth wave which is synchronized in the usual way and is used for horizontal deflection of the beam of the oscillator 14.

A condenser $C_1$, which is indicated as being a variable condenser, is connected from the lead 11 to a point 16 on the lead 4 between the lower end 17 of resistance $R_1$ and the other input terminal 18 of the vertical beam deflection system of the oscillograph 14.

The operation is as follows when a capacitance, for example, is to be measured.

A steep wave front signal such as the square wave signal indicated in Fig. 3 is applied to the input terminals 1 and 2 with the condenser $C_x$ between terminals 7 and 10. The condenser $C_1$ is adjusted until a square wave 20 appears upon the face 21 of the cathode-ray tube of the oscillograph 14, thus showing a balance of the impedance. The relationship is then:

$$C_x = C\frac{R_1}{R}$$

where C is the capacitance of the condenser $C_1$ plus the distributed capacitance $C_3$ of the wiring and the input to the oscillograph 14, or, $$C = C_1 + C_3$$

The value of the unknown capacitance $C_x$ can be obtained.

When an unknown resistance is to be measured it may be put in the place where $R_1$ is and a known condenser $C_2$ put where $C_x$ is, and then when balance is obtained by varying condenser $C_1$ the resistance is:

$$R_1 = R\frac{C_2}{C}$$

A pair of inductances $L_x$ and L may be used instead of the condensers $C_x$ and $C_1$, as indicated in Fig. 2. When balance is obtained:

$$L_x = L\frac{R}{R_1}$$

The device operates as a balanced attenuator, the balanced condition being shown by the oscillograph. When balance obtains:

$$R:R_1 = C:C_x \text{ or } R:R_1 = L_x:L$$

With the resistances alone, all signals applied at terminals 1 and 2 are transmitted with attenuation proportional to:

$$\frac{R_1}{R+R_1}$$

independent of frequency, and the signals are applied to the terminals 13 and 18 of the oscillograph 14.

When the device is out of balance due to the reactance between the leads 4 and 11 being too large, the signal on the face 21 will become more like Fig. 4; and when the device is out of balance due to the reactance between the leads 4 and 11 being too small, the signal on the face 21 will become more like Fig. 5.

What is claimed is:

1. In a device of the character described means for measuring impedances which comprises a three terminal network made up of a parallel connected pair of known impedances, one of which is resistive and the other is reactive, connected in series with a third known impedance which is of the same type as one of said known impedances, at least one of said impedances being adjustable, said third impedance being connected to terminals at opposite ends of this third impedance which are adapted to be connected to the ends of an impedance to be measured, input terminals for a signal of complex wave form connected to opposite ends of said series connected three terminal network, output terminals connected to opposite ends of said parallel connected pair of impedances and a wave form indicating device to which said output terminals are connected.

2. The device of claim 1 in which said third known impedance is resistive.

3. The device of claim 1 in which said third known impedance is capacitive.

4. The device of claim 1 in which said third known impedance is inductive.

5. The device of claim 1 in which the known reactive impedance of said parallel connected pair is capacitive and variable.

6. The device of claim 1 in which the known reactive impedance of said parallel connected pair is inductive and variable.

PETER S. CHRISTALDI.